United States Patent [19]

Bogdanski et al.

[11] 4,026,754

[45] May 31, 1977

[54] DOUBLE ADHESIVE TAPE APPLYING APPARATUS

[75] Inventors: John J. Bogdanski, Stamford; Harold Silverman, Norwalk, both of Conn.

[73] Assignee: Pitney-Bowes, Inc., Stamford, Conn.

[22] Filed: July 12, 1976

[21] Appl. No.: 704,281

[52] U.S. Cl. .......... 156/521

[51] Int. Cl.$^2$ .......... B32B 31/00

[58] Field of Search .......... 156/519, 521, 522

[56] References Cited

UNITED STATES PATENTS

| | | | |
|---|---|---|---|
| 2,543,004 | 2/1951 | Dewyer | 156/519 |
| 2,949,148 | 8/1960 | Rayburn et al. | 156/521 |
| 2,990,081 | 6/1961 | De Neui et al. | 156/519 |
| 3,676,266 | 7/1972 | Jensen et al. | 156/521 |

*Primary Examiner*—Douglas J. Drummond
*Attorney, Agent, or Firm*—Albert W. Scribner; William D. Soltow, Jr.; Martin D. Wittstein

[57] ABSTRACT

An apparatus for applying tape, having adhesive on both of its faces, to a surface comprises an applicator drum having a cylindrical periphery that receives the tape and a series of slots extending transversely to the periphery. The applicator drum is mounted on a shaft which can be driven by a motor. The shaft is, in turn, mounted on a lever which can be pivoted by a solenoid to translate the drum toward and away from the surface. The tape is cut into discreet lengths on the drum by a knife which registers in interfitting engagement with each of the slots in the drum periphery when translated away from the surface. The solenoid and motor are synchronously operated to rotate the drum to put a length of tape in position for transfer to the surface, to translate the drum toward the surface to complete the transfer, and to translate the drum away from the surface to register the knife in interfitting engagement with a drum slot and thereby cut a next length of tape for subsequent transfer.

11 Claims, 4 Drawing Figures

DOUBLE ADHESIVE TAPE APPLYING APPARATUS

BACKGROUND OF THE INVENTION

1. Field of the Invention

The present invention relates to an apparatus for applying tape, having adhesive on both of its faces, to a surface. For example, the apparatus may be used to apply this kind of tape to one flap of a corrugated boxboard or cardboard carton so that an overlying flap can be sealed thereto in order to close the carton. Similarly, the apparatus may be used to apply tape to the flap of an envelope so that the envelope can be sealed.

Though the apparatus has particular utility in package sealing applications such as those described above, it may also be modified for use in any other application to apply tape having two adhesive faces to a surface.

2. Description of the Prior Art

Various apparatus are known for preparing a carton or envelope to be sealed. Perhaps the most common of these is one which applies to a liquid or semi-liquid adhesive to a carton or envelope flap. The adhesive may be of the type which dries after application but which is later activated when moistened or of the type which remains tacky but which is covered with a protective film or cover until use.

Apparatus for applying such adhesives typically include a tank for storing the adhesive, a system of conduits for conducting the adhesive in liquid or semi-liquid form to an application station and an applicator device located at the station which, for example, may be a roller, brush or the like.

Such apparatus have certain obvious drawbacks. Perhaps most importantly, because of the sticky nature of the adhesive, they ordinarily require frequent maintenance and cleaning to prevent them from becoming clogged. When operation of the apparatus is stopped for any length of time, the adhesive conduits and applicator device are cleaned to prevent them from being gummed up. Therefore, maintenance and cleaning of such apparatus takes a significant amount of time and expense.

Devices for applying tape having adhesive on both of its faces are also known. For example, U.S. Pat. No. Re.25,056 (Fritzinger) discloses a relatively complicated apparatus for applying a double adhesive faced tape which initially has a nonadhesive backing strip on one face. The device includes a tape feed mechanism for conducting the tape to a circumferentially and axially grooved applicator roll and for removing the backing strip. The roll though rotatable, is not translatable in the device. A blade is positioned to strike the roll periphery to cut tape carried thereon.

SUMMARY OF THE INVENTION

The apparatus of the present invention eliminates problems characteristic of prior art apparatus for applying liquid or semi-liquid adhesive which arise from the difficulty of handling such adhesives in these forms. Specifically, the apparatus of the present invention does not include any adhesive ducts or liquid adhesive applicator devices since it does not, in fact, apply a free flowing liquid adhesive. Therefore, extensive cleaning and maintenance of the apparatus of the present invention is not necessary. Rather, operation of the apparatus can be stopped at any time and resumed at any later time without special care.

The apparatus of the present invention applies a tape, having adhesive on both its faces, to a surface such as a carton or envelope flap so that the carton or envelope may be sealed at a later time. Since the adhesive is held on a backing tape it may be easily handled without impeding apparatus operation. Moreover, the apparatus of the present invention operates to apply discreet lengths of tape at specified surface locations as well as to separate the tape into the lengths for application.

In its preferred form, the apparatus comprises an applicator drum which has a cylindrical periphery for receiving tape by contact with one of the surfaces of the tape. At least one and preferably a number of slots extend transversely to the cylindrical periphery to divide it into a number of equal arcuate segments. The drum is mounted for compound movement first on a shaft that can be rotated by a motor. The shaft is mounted on a pivotable lever, actuated by a solenoid, so that the drum can be moved toward and away from the surface of the envelope or carton flap. A knife is registrable in interfitting engagement with one applicator drum slot when the drum is moved away from the surface. In this way, tape received on the periphery of the wheel is cut into discreet lengths.

The motor and solenoid operate in synchronism to rotate the drum to place a length of tape in position for transfer to the surface, to translate the drum toward the surface to transfer the tape thereto, and to then translate the drum away from the surface so that tape on the drum periphery is cut by the knife. If the apparatus is adapted for applying tape at spaced locations to a moving surface, rotation of the applicator wheel is synchronized with movement of the surface.

The apparatus of the present invention provides a convenient means for preparing a surface with adhesive yet avoids problems associated with handling liquid or semi-liquid adhesive encountered by certain prior art apparatus. Moreover, this apparatus is extremely simple in operation.

Accordingly, it is an object of the present invention to provide an apparatus which prepares a surface with adhesive in a simple, yet economical manner and which requires a minimum of maintenance and cleanup.

Other objects, aspects and advantages of the present invention will be pointed out in, or will be understood from, the following detailed description provided below in conjunction with the accompanying drawings.

DETAILED DESCRIPTION OF THE PREFERRED EMBODIMENT

Figure 1:
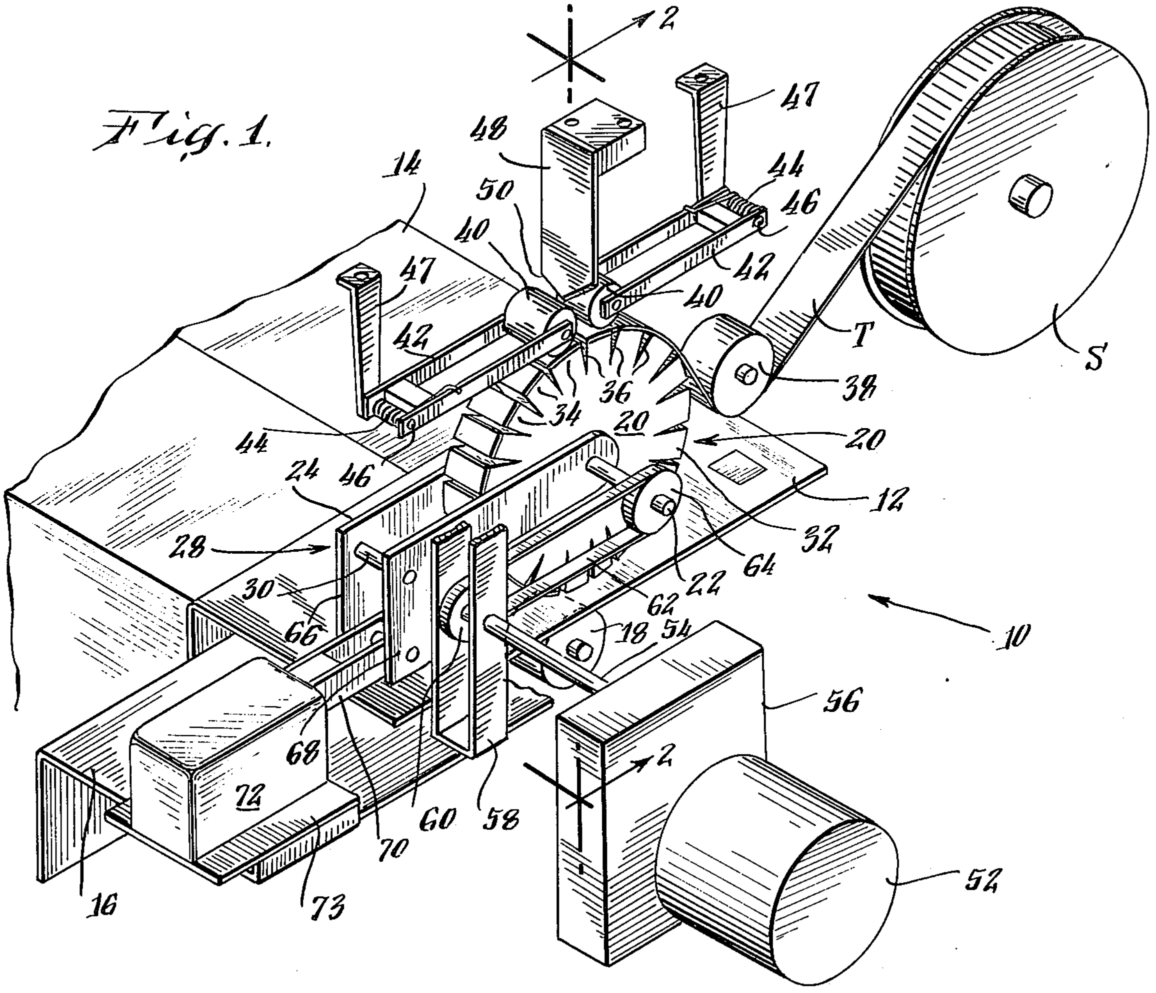
FIG. 1 is a diagrammatic perspective view of the apparatus of the present invention shown applying discreet lengths of double adhesive tape to the flap of a boxboard carton.

As shown in FIG. 1, the apparatus of the present invention, generally indicated at 10, is adapted to apply discreet lengths of tape, which has adhesive on both of its faces, at spaced locations to a surface in the form of a boxboard carton flap 12. However, the apparatus may be easily adapted to apply such tape to other surfaces such as envelope flaps. Moreover, though illustrated as a permanent unit arranged to have the carton flap 12 transported through it, the invention of apparatus 10 may be embodied in a portable unit which applies such tape by being moved over the desired surface.

Figure 2:
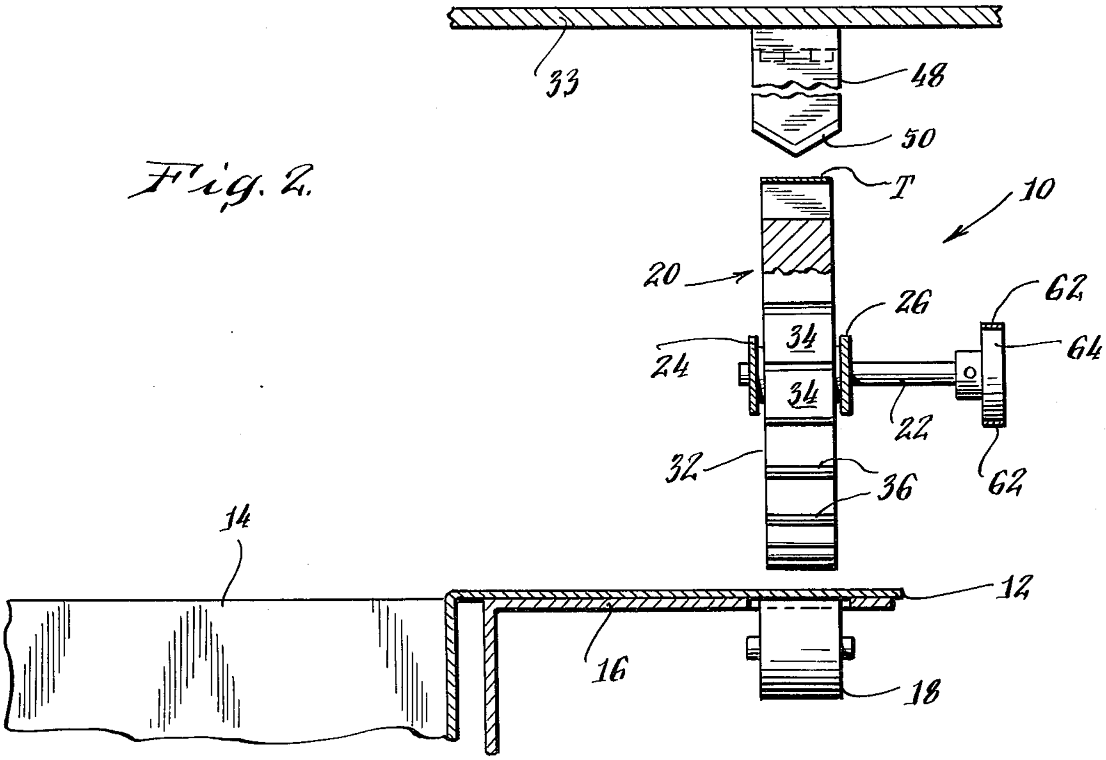
FIG. 2 is a partial vertical cross-sectional view taken through plane 2—2 in FIG. 1 showing the relationship of the carton flap to the applicator drum.

As shown in FIG. 1, the apparatus comprises a support platform 16 over which the carton flap 12 is transported by a conveyor mechanism. As can be seen in FIG. 2, flap 12 is bent horizontally outwardly from the carton 14 so that tape is applied to its inwardly facing side. In this manner, the flap may be folded over a corresponding, oppositely directed flap on the other side of the carton to seal thereagainst.

Figure 3:
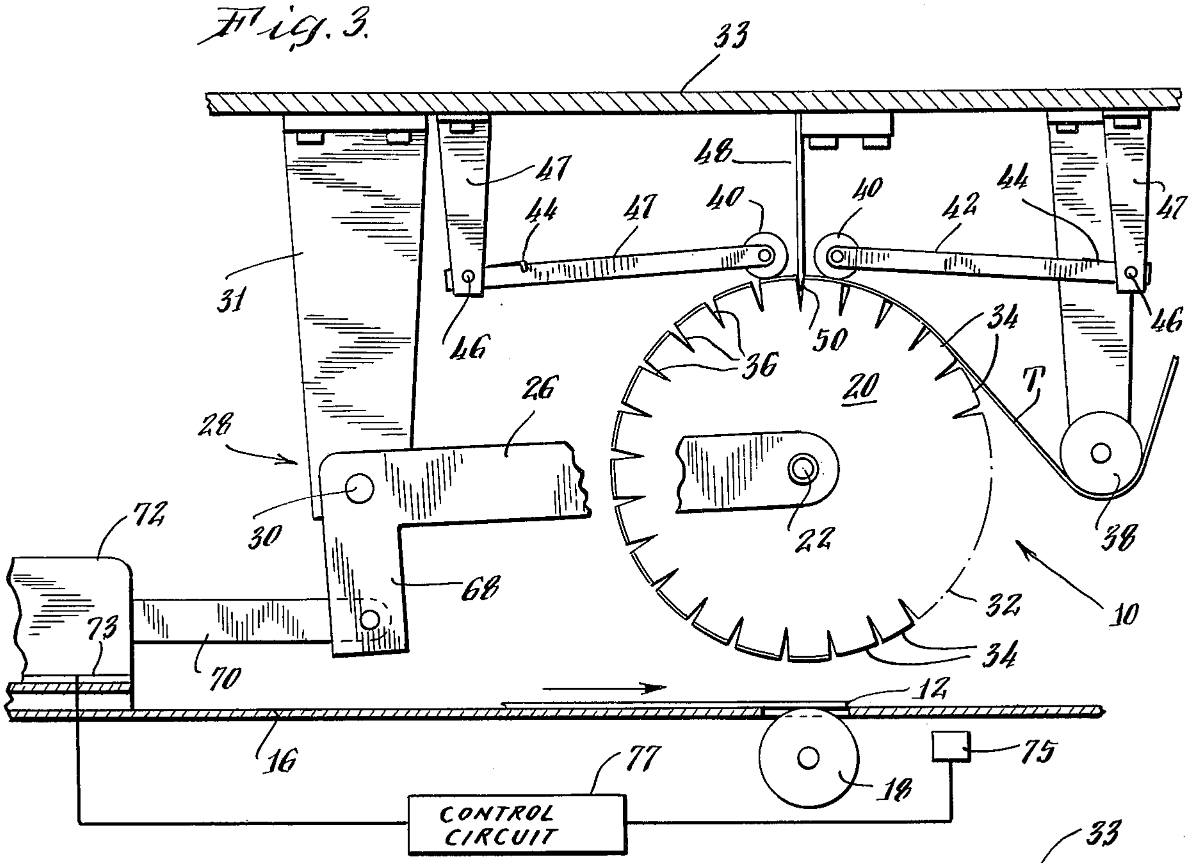
FIG. 3 is a front elevational view of the apparatus shown with the applicator drum moved away from the carton flap and with the knife registered in interfitting engagement with one drum slot to cut the tape.
Figure 4:
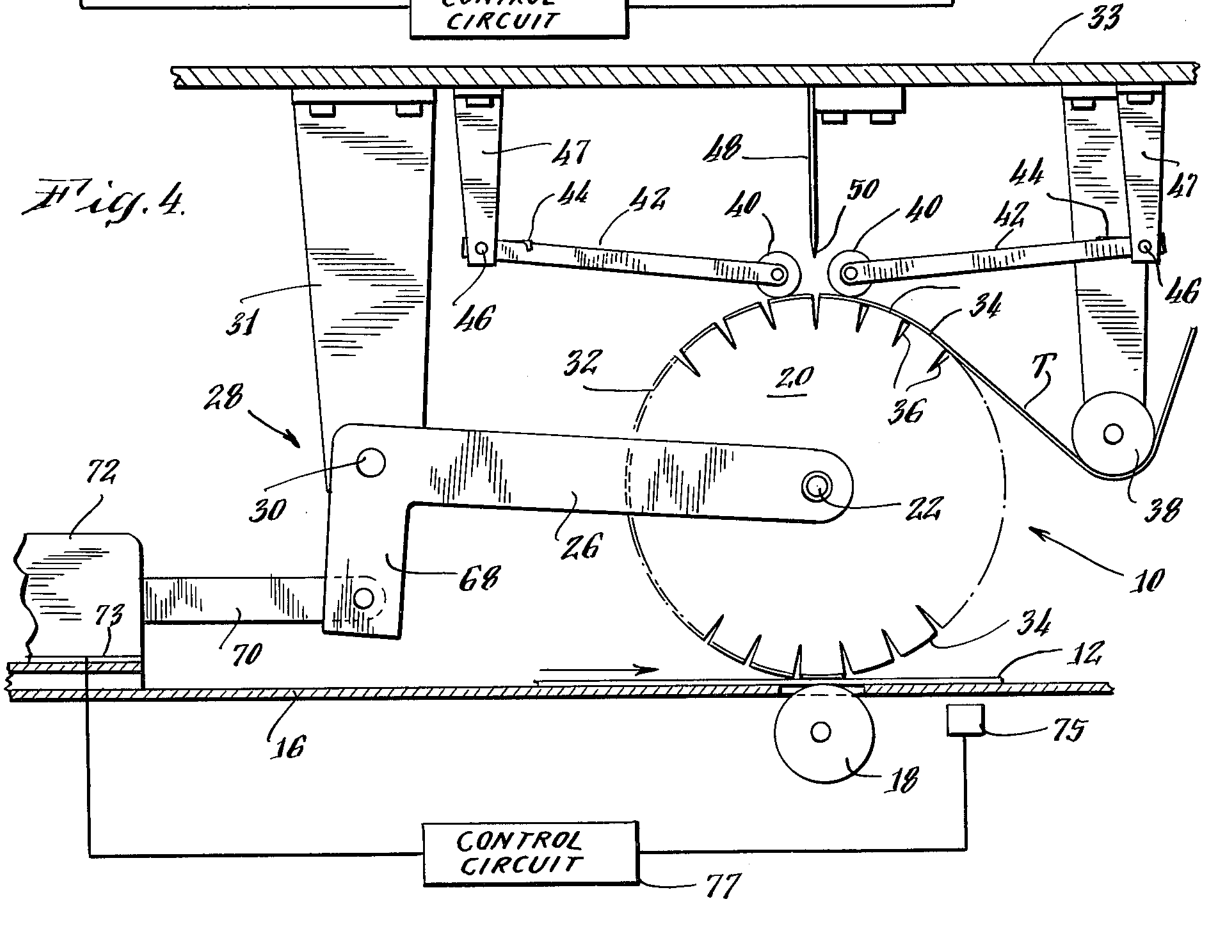
FIG. 4 is a second front elevational view of the apparatus shown with the applicator wheel moved toward the surface to transfer a section of tape thereto.

Flap 12 is fed between a backup roller 18, which forms part of the conveyor mechanism and is mounted beneath and projects through a hole in the support platform 16, and an applicator drum 20, which is mounted for rotation on a shaft 22. The shaft is mounted on antifriction bearings (not shown) to span the distance between two arms 24 and 26 of a bell crank, generally indicated at 28, which is mounted for pivoted movement about a fulcrum shaft 30. The fulcrum shaft 30 may be supported, for example, by a bracket 31 suspended from an upper housing 33 of the apparatus (FIGS. 3 and 4).

The applicator drum 20 has a cylindrical peripheral surface 32 which is divided into a number of arcuate lands 34 by a series of radially inwardly directed, axially extending slots 36 that subtend equal angles.

A tape T, having any suitable adhesive on both of its faces, is fed to the periphery 32 of applicator drum 20 from a supply roll S over an idler roll 38. Both the supply and idler rolls are mounted for rotation on brackets suspended from the upper housing. Since the adhesive on one face of tape T adheres to the periphery of the applicator drum 20, rotation of the drum in a counterclockwise direction as shown in FIGS. 1, 3, and 4, draws the tape off the supply roll automatically in a manner to be described below.

Two pressure rollers 40, having axes of rotation extending parallel to the axis of rotation of the drum 20, are mounted on generally horizontally extending arms 42 that pivot on shafts 46 and are urged toward the drum 20 by torsional coil springs 44. The shafts 46 are mounted with brackets 47 that depend from the housing 33. These pressure rolls insure that the tape firmly contacts the applicator drum periphery. A knife 48, having a sharp, generally V-shaped edge 50, depends from the top of the upper housing between the pressure rolls 40 in a manner shown in detail in FIGS. 1, 3, and 4. The knife edge 50 may be registered with each of the applicator drum slots 36 to cut the tape T received thereon into discreet lengths corresponding to the circumferential length of the lands 34. The pressure rolls 40 also hold the tape in position on the drum periphery during insertion and withdrawal of the knife from each slot.

The applicator drum 20 may be moved in two modes to cut, advance, and apply the tape to the flap. That is, the drum can be rotated to advance the tape into position for application to the carton flap and further can be translated between a tape transferring position moved toward the flap and a tape cutting position moved away from the flap toward the knife 48. Specifically, the drum is rotated by a motor 52 which is coupled to a shaft 54 through a reduction gear train 56. The shaft 54 is journaled in a U-shaped bracket 58, suspended from the top of the apparatus housing, so that it is coaxial with fulcrum shaft 30 for reasons described below. A sprocket or toothed pulley 60 is mounted for rotation with shaft 54 and is linked by an endless chain or toothed belt 62 to a corresponding sprocket or toothed pulley 64 that is coupled to shaft 22.

Translational movement of the wheel is accomplished by pivoted movement of the bell crank 28. In particular, the downwardly directed legs 66 and 68 of the bell crank 28 are connected at a location remote from the fulcrum shaft 30 to the armature 70 of a spring loaded solenoid 72. This solenoid is mounted on a small table 73 connected at one edge with and spaced by a small distance from the platform 16 to permit the carton flap to move between the table 73 and platform 16. When the solenoid is actuated, armature 70 is drawn into the solenoid to pivot the applicator drum downwardly toward the carton flap 12. However, when the solenoid is deenergized, the spring load (not shown) in it urges the applicator drum upwardly away from the surface into engagement with the knife. The shaft 54 is coaxial with fulcrum shaft 30 to permit free pivoting of crank 28 without placing the belt 62 in tension.

The apparatus of the present invention is operated to apply discreet lengths of tape to the carton flap in the following manner. When the flap is advanced into the apparatus, it trips a sensor 75, such as a photocell, which signals a control circuit 77 (FIGS. 3 and 4) to energize the solenoid and pivot the applicator drum toward the flap. Simultaneously, the motor is energized by the control circuit to begin rotating the drum to advance a section of tape into position for application but only after the knife has been disengaged from a slot. The drum is driven positively through the sprocketed pulleys and belt so that its periphery rotates at the same linear speed as that of the carton flap. When the drum actually makes contact with the flap, the section of tape is rolled thereon. The advance of the drum is equal to the angle subtended by each land 34 between adjacent slots 36. After the drum has been advanced to apply one section of tape, the solenoid and motor are both deenergized to stop rotation of the drum and to permit it to return upwardly to the position shown in FIG. 3. Deenergization if synchronized so that the knife blade registers in interfitting engagement with one slot 36 to cut tape at the top of the drum into a next succeeding length.

Actuation of the solenoid and motor may be incremental and timed to apply discreet lengths of tape at several spaced locations to the flap. In order to do so, a series of sensors are incorporated in the support structure 16 to sense the advance of the flap through the apparatus. The apparatus is then incrementally actuated as each sensor is tripped to apply a length of tape.

In the preferred embodiment, all tape contacting components including idler roll 38, applicator drum 20, and pressure rollers 40, are provided with surfaces having a low coefficient of friction. Therefore, the adherence of the tape for these components is sufficient to hold the tape thereon but permits it to be easily transferred therefrom. Accordingly, when the applicator drum is moved toward the flap, the coefficient of friction between the tape and the flap is greater than that between the tape and the drum. Therefore, the tape is positively transferred to the flap. It has been found that these components may be made from a material such as that sold under the trade name "Delrin".

It will be appreciated that the apparatus of the present invention may be modified in various ways for different applications. For example, the slots 36 may be fewer in number and spaced by greater angles to apply longer lengths of tape. In such applications, the applicator drum is again rotated at the same peripheral speed as that of the advancing surface to which the tape is to be applied.

As can be seen from the above description, the apparatus of the present invention operates in a simple manner, has few parts which are also simple, and effectively applies a double adhesive tape to a surface in a controlled manner. Therefore, problems of prior art apparatus, which apply free flowing adhesive, are avoided. The apparatus may be stopped and started at any time and may be turned off indefinitely without cleaning or maintenance in preparation of subsequent start-up.

Although a preferred embodiment of the present invention has been described above in detail, it is to be understood that this is for purposes of illustration. Modification may be made to the described structure by those skilled in the art in order to adapt this double adhesive tape applicator to particular applications.

What is claimed is:

1. An apparatus for applying tape, having adhesive on both of its faces, to a surface, said apparatus comprising:

A. an applicator drum having
   1. a cylindrical periphery for receiving the tape by contact with one of the tape faces, and
   2. at least one slot extending transversely to said periphery, B. means for moving said applicator drum
   1. toward the surface with the other of the tape faces in contact therewith;
   2. away from the surface, C. cutting means registrable in interfitting engagement with said applicator drum slot when said applicator drum is moved away from the surface, relative to and into cooperation with the cutting means to cut tape received on the applicator drum periphery; and D. motor means for rotating said applicator drum to position tape received thereon for transfer to the surface when said drum is moved toward the surface.

2. The apparatus for applying tape to a surface as claimed in claim 1 wherein the surface may be moved linearly relative to said applicator drum and wherein said rotating means rotates said applicator drum periphery at the same linear speed as that of the surface during transfer of the tape thereto.

3. The apparatus for applying tape to a surface as claimed in claim 2 wherein said rotating means incrementally rotates said applicator drum only when said cutting means and applicator wheel are not registered in interfitting engagement.

4. The apparatus for applying tape to a surface as claimed in claim 1 wherein said applicator drum has a plurality of said slots; is incrementally rotated by said rotating means through an angle subtended by the arc defined between adjacent slots and is moved by said moving means toward said surface and away therefrom in synchronism with the incremental rotation to cut the tape with said cutting means into discreet lengths for transfer to the surface.

5. The apparatus for applying tape to a surface as claimed in claim 4 further comprising means for effecting continuous relative movement between the surface and said applicator drum during incremental rotation and movement of said drum toward and away from the surface to transfer the discreet lengths of the tape to the surface at spaced locations.

6. The apparatus for applying tape to a surface as claimed in claim 1 further comprising:

means for urging the tape into firm contact with said periphery of said applicator drum.

7. The apparatus for applying tape to a surface as claimed in claim 6 wherein said urging means comprises: 1. at least one pressure roll; and 2. means for urging said pressure roll toward contact with said periphery of said applicator drum.

8. The apparatus for applying tape to a surface as claimed in claim 6 wherein said urging means comprises:

1. two pressure rolls each having an axis of rotation extending in mutually parallel relation to the axis of rotation of said applicator drum, said cutting means being positioned between said pressure rolls when registered in interfitting relation with said slot to urge the tape into firm contact with said applicator wheel both before and after being cut, and
2. means for urging said pressure rolls toward contact with said periphery of said applicator drum.

9. The apparatus for applying tape to a surface as claimed in claim 1 wherein said periphery of said applicator drum has a coefficient of friction less than the coefficient of friction of the surface.

10. The apparatus for applying tape to a surface as claimed in claim 1 wherein said moving means comprises:

1. a shaft on which said applicator drum is mounted for rotation;
2. lever means, for supporting said shaft, having a fulcrum spaced from said shaft to pivot said applicator drum toward and away from the surface, and
3. means for pivoting said lever means about said fulcrum.

11. The apparatus for applying tape to a surface as claimed in claim 10 wherein said rotating means comprises 1. a first pulley attached to said applicator drum shaft for rotation therewith,
2. a drive shaft having an axis which passes through said fulcrum,
3. a second pulley attached to said drive shaft,
4. endless belt means for linking said first and second pulleys; and
5. motor means for rotating said drive shaft.

* * * * *